(12) United States Patent
Weinholt et al.

(10) Patent No.: US 9,130,815 B2
(45) Date of Patent: Sep. 8, 2015

(54) METHOD, RECEIVER, TRANSMITTER AND COMMUNICATION SYSTEM FOR PHASE ERROR COMPENSATION

(75) Inventors: Dan Weinholt, Västra Frölunda (SE); Carmelo Decanis, Travacò Siccomario (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/130,962

(22) PCT Filed: Jul. 8, 2011

(86) PCT No.: PCT/EP2011/061566
§ 371 (c)(1),
(2), (4) Date: Jan. 6, 2014

(87) PCT Pub. No.: WO2013/007275
PCT Pub. Date: Jan. 17, 2013

(65) Prior Publication Data
US 2014/0140432 A1 May 22, 2014

(51) Int. Cl.
*H04L 27/38* (2006.01)
*H04L 27/36* (2006.01)
*H04L 5/00* (2006.01)
*H04L 25/06* (2006.01)
*H04L 27/34* (2006.01)

(52) U.S. Cl.
CPC ............ *H04L 27/38* (2013.01); *H04L 5/003* (2013.01); *H04L 27/361* (2013.01); *H04L 25/067* (2013.01); *H04L 27/34* (2013.01)

(58) Field of Classification Search
CPC ...... H04L 27/361; H04L 27/34; H04L 25/067; H04L 27/2647
See application file for complete search history.

(56) References Cited

U.S. PATENT DOCUMENTS

| | | | |
|---|---|---|---|
| 4,899,367 A | 2/1990 | Sampei | |
| 6,618,352 B1* | 9/2003 | Shirakata et al. | 370/203 |
| 7,111,226 B1* | 9/2006 | Cameron et al. | 714/794 |
| 2006/0078058 A1* | 4/2006 | Lin | 375/260 |
| 2011/0096876 A1* | 4/2011 | Meyer | 375/346 |
| 2012/0177161 A1* | 7/2012 | Husted | 375/371 |
| 2012/0236966 A1* | 9/2012 | Murakami et al. | 375/298 |

FOREIGN PATENT DOCUMENTS

| | | |
|---|---|---|
| EP | 0734132 A2 | 9/1996 |
| EP | 1075099 A2 | 2/2001 |

* cited by examiner

*Primary Examiner* — Leon-Viet Nguyen
(74) *Attorney, Agent, or Firm* — Coats & Bennett, P.L.L.C.

(57) ABSTRACT

A method of compensating phase error of a received signal is disclosed. The signal comprises a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying, A-PSK, signal configuration, wherein both the symbols of the first type and of the second type carries data and wherein the symbols of the second type also are arranged as pilot symbols for determination of phase rotation determination. A receiver and transmitter, as well as a communication system, employing the symbol set are disclosed.

15 Claims, 4 Drawing Sheets

_US 9,130,815 B2_

METHOD, RECEIVER, TRANSMITTER AND COMMUNICATION SYSTEM FOR PHASE ERROR COMPENSATION

TECHNICAL FIELD

The present invention generally relates to an approach for compensating phase error of a received signal and for providing a signal suitable for such compensation. In particular, the invention relates to a method for such phase error compensation, to a receiver adapted to such error compensation, to a transmitter enabling a suitable signal with such symbol set, and to a communication system employing the approach.

BACKGROUND

The present disclosure deals with issues of coherent demodulation of high order signal constellations, such as N-Quadrature Amplutude Modulation (N-QAM) where N is an integer, in phase noise environments.

One way to perform phase tracking of carrier recovery loop in coherent demodulation of high order QAM signal constellations is to periodically insert pilot symbols of lower constellation order, e.g. a 4-QAM pilot for a 64-QAM transmission. The reason is reduction in decision errors of these low-constellation order symbols compared to the symbols used for the payload transmission. The lower error probability is used in the carrier recovery, e.g. by applying a higher weight for such pilot symbols in phase error tracking determination.

A problem with existing technology is that the carrier recovery may produce fairly long error bursts due to the inherent drawbacks in phase error tracking on these symbols, and another problem is that introduction of more pilots scavenge the payload, i.e. traffic throughput is reduced.

SUMMARY

An object of the invention is to at least alleviate the above stated problem. The present invention is based on the understanding that pilot signals may be used to carry payload as well. The inventor has realised that assigning a particular signal scheme to the pilots make them particularly suitable for phase tracking while they still will be able to carry payload, and thus have dual purposes. The assigned signal scheme of these symbols is further particularly robust for keeping track of phase also for relatively large phase errors, and particularly in view of the amount of payload with these symbols can contribute compared to using "clean" pilots. The improved phase tracking and the additional payload of these symbols improve traffic throughput.

According to a first aspect, there is provided a method of compensating phase error of a received signal representing a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying, A-PSK, signal configuration, wherein both the symbols of the first type and of the second type carries data and wherein the symbols of the second type also are arranged as pilot symbols for determination of phase rotation determination. The method comprises receiving the signal; providing the signal to a phase calculator; determining symbol phase value and phase from symbols of the second type by the phase calculator; providing determined phase by the phase calculator; performing a phase correction according to the determined phase and providing the corrected signal to a symbol demodulator; and determining data carried by the symbols by demodulating the corrected signal by the symbol demodulator.

The N-QAM signal may have a minimum distance d between any nominal signal points of signal space and the A-PSK may have a minimum distance between any nominal signal points of signal space being equal or larger than d.

The method may further comprise delaying the signal before providing it to phase correction such that any signal delay of the phase calculator is compensated.

The A-PSK symbol may have a $N_1 \times N_2$ configuration, where $N_1$ is an integer larger than one defining the number of signal points on each phase-shift keyed position, and $N_2$ defines the number of phase-shift keyed positions and being either of 2 or 4.

The determining of symbol phase value and phase error from symbols of the second type may comprise i) phase rotating the signal according to a previously determined phase by a phase rotator; ii) determining a rough symbol phase value from the phase rotated signal by determining which half-plane or which quadrant the symbol belongs to, for a symbol having two or four nominal phase positions, respectively; iii) calculating the phase of the signal from the determined symbol phase value and the phase position of a signal point of the signal; and iv) filtering the phase and providing it to the phase rotator such that next symbol of the signal is enabled to be phase rotated according to step i).

According to a second aspect, there is provided a receiver for receiving a signal representing a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying, A-PSK, signal configuration, wherein both the symbols of the first type and of the second type carries data and wherein the symbols of the second type also are arranged as pilot symbols for determination of phase rotation determination. The receiver comprises radio circuitry for receiving the signal; a signal splitter arranged to provide the signal to a phase calculator and to a signal pre-rotator, wherein the phase calculator is arranged to determine symbol value and phase from symbols of the second type, and to provide determined phase to the signal pre-rotator, the signal pre-rotator is arranged to perform a phase correction according to the determined phase and provide the corrected signal to a symbol demodulator, and the symbol demodulator is arranged to determine data carried by the symbols by demodulating the corrected signal.

The phase calculator may comprise a phase-locked loop, PLL, comprising a phase rotator, a rough symbol phase decision calculator, and phase calculator, and a loop filter, wherein the phase rotator is arranged to receive the signal and a filtered phase value from the loop filter on which the phase rotator is arranged to provide a rotated signal value to the phase calculator and the rough symbol phase decision calculator, wherein the rough symbol phase decision calculator is arranged to determine nominal phase of the received symbol of the second type and provide the symbol value to the phase error calculator, and the phase calculator is arranged to calculate phase of the symbol from the phase position of the symbol and the rotated signal value, which phase is provided to the loop filter through which the phase is filtered to provide the filtered phase to the phase rotator.

The phase calculator may further comprise a phase error estimator providing an estimate of phase from a phase error output from the phase calculator and from the filtered phase output from the loop filter such that the estimate of phase of the signal is provided to the pre-rotator.

The rough symbol phase decision calculator may be arranged to determine phase position of the symbol by determining which half-plane or which quadrant the symbol belongs to, for a symbol having two or four nominal phase positions, respectively.

The phase calculator may be arranged to determine the phase error and provide the phase error to the pre-rotator.

The symbol demodulator may be arranged to provide output data carried by both the symbols of the first type and of the second type.

According to a third aspect, there is provided a transmitter of a signal representing a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying, A-PSK, signal configuration, wherein both the symbols of the first type and of the second type carries data and wherein the symbols of the second type also are arranged as pilot symbols for determination of phase rotation determination at destination. The transmitter comprises a modulator arranged to modulate the N-QAM symbols and arranged to modulate the A-PSK symbols, wherein both the N-QAM symbols and the A-PSK symbols are modulated to carry data; and radio circuitry for transmitting the modulated signal.

The N-QAM signal may have a minimum distance d between any nominal signal points of signal space and the A-PSK has a minimum distance between any nominal signal points of signal space being equal or larger than d.

The A-PSK symbol may have a $N_1 \times N_2$ configuration, where $N_1$ is an integer larger than one defining the number of signal points on each phase-shift keyed position, and $N_2$ defines the number of phase-shift keyed positions and being either of 2 or 4.

According to a fourth aspect, there is provided a communication system for data transmission of a signal representing a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying, A-PSK, signal configuration, wherein both the symbols of the first type and of the second type carries data and wherein the symbols of the second type also are arranged as pilot symbols for determination of phase rotation determination at destination. The communication system comprises a transmitter according to the third aspect and a receiver according to the second aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION OF PREFERRED EMBODIMENTS

Depending on the actual phase noise level it can for high order constellations be sufficient to use pilot symbols of a higher modulation order than 4QAM (8, 16, 32, etc). However, these constellations are optimized for detection performance in general and not for use as pilot symbols in a carrier phase tracking system including a pilot-PLL since most symbol detection errors also result in phase detection errors. The basic concept of the invention is to create a constellation of higher order than 4QAM (2 bits/symbol) that is also optimized for use as phase tracking pilot symbols in a pilot-PLL application. By using a higher order symbol for the pilot symbols, these can also be used for carrying some data load.

Figure 1:
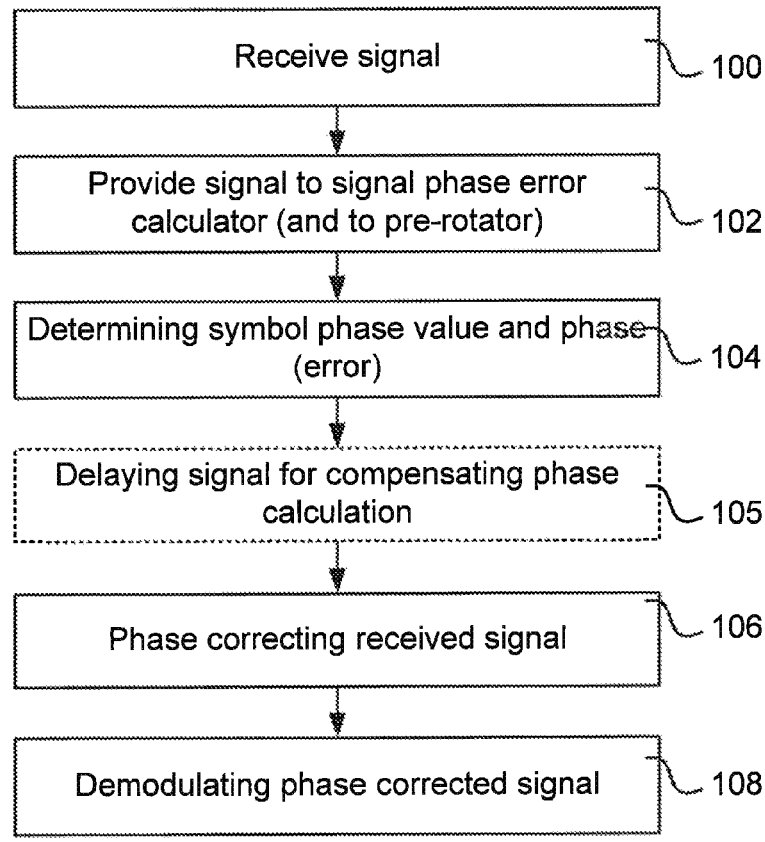
FIG. 1 is a flow chart illustrating methods according to embodiments.

FIG. 1 is a flow chart illustrating methods according to embodiments which will be elucidated below. The methods of compensating phase error of a received signal employs on a signal representing a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying, A-PSK, signal configuration. Both the symbols of the first type and of the second type carries data to improve data throughput. The symbols of the second type are also arranged as pilot symbols for determination of phase rotation determination. The method includes receiving 100 the signal and providing 102 the signal to a phase error calculator. In the phase error calculator, symbol phase value and phase error from symbols of the second type are determined 104. As will be described below with reference to illustrations of signal configurations, the symbol phase value determination is possible to be strongly facilitated with the suggested structure. The determined phase error is thus provided such that it is enabled to perform 106 a phase correction according to the determined phase error and provide the corrected signal to a symbol demodulator, wherein data carried by the symbols can be determined by demodulating 108 the corrected signal. Optionally, the method can include delaying 105 the signal before providing it to phase correction such that any signal delay of the phase error calculator is compensated.

Figure 2:
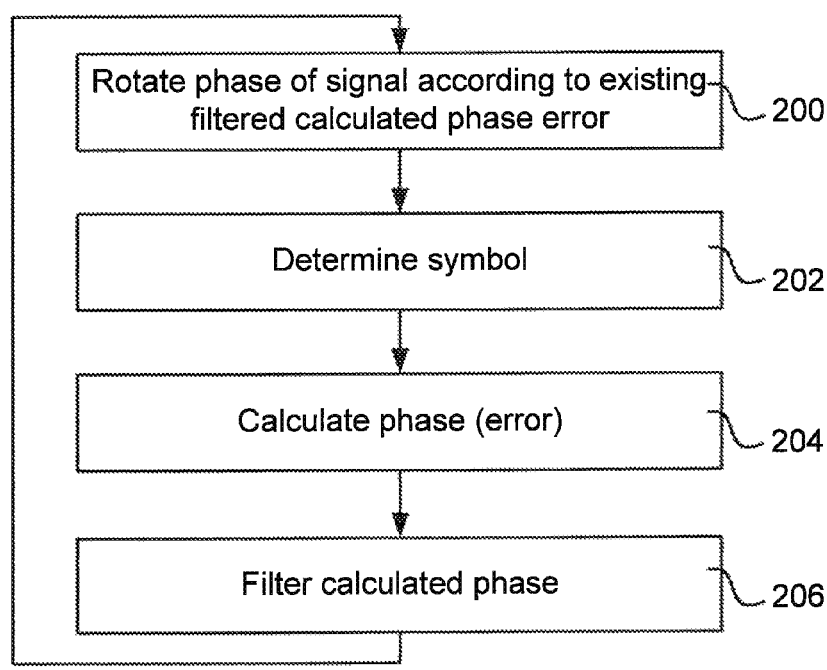
FIG. 2 is a flow chart illustrating phase error determination according to an embodiment.

FIG. 2 is a flow chart illustrating phase error determination according to an embodiment. The determining 104 indicated in FIG. 1 of symbol phase value and phase error from symbols of the second type can comprise phase rotating 200 the signal according to a previously determined phase error by a phase rotator, determining 202 a rough symbol phase value from the phase rotated signal by determining which half-plane or which quadrant the symbol belongs to, for a symbol having two or four nominal phase positions, respectively, calculating 204 the phase error of the signal from the determined symbol phase value and the phase position of a signal point of the signal, and filtering 206 the phase error and providing it to the phase rotator such that next symbol of the signal is enabled to be phase rotated. By running this procedure continuously, the phase error is tracked and any drifting phase can be kept on track since difference between phase position and symbol phase value is kept low, and the determined symbol phase value therefore is likely to be correct. A further advantage of this is that it enables the implementation to be a phase-locked loop (PLL), implying simple and robust implementation.

Figure 3:
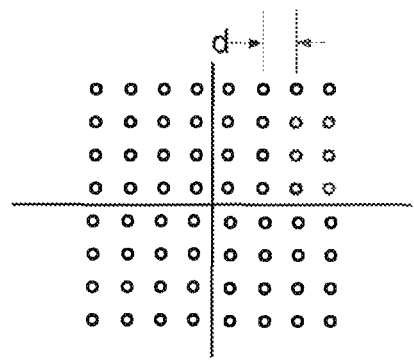
FIG. 3 schematically illustrates a signal space with nominal positions of possible signal points for a 64-QAM signal scheme.
Figure 4:
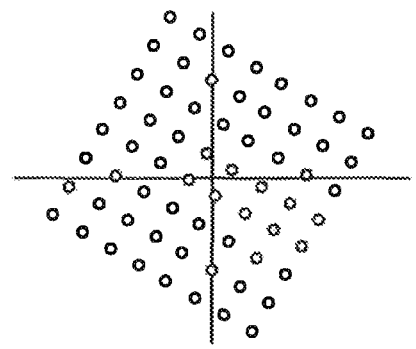
FIG. 4 schematically illustrates the signal space of FIG. 3 where a phase error of $\pi/6$ has moved signal points from their nominal positions.
Figure 5:
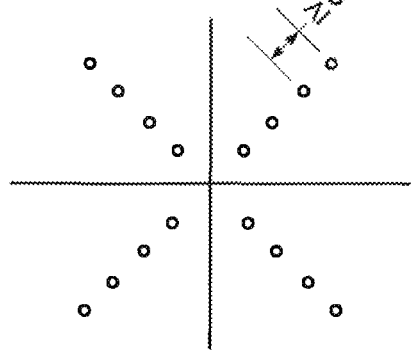
FIG. 5 schematically illustrates a signal space with nominal positions of possible signal points for a 4×4 A-PSK signal scheme.
Figure 6:
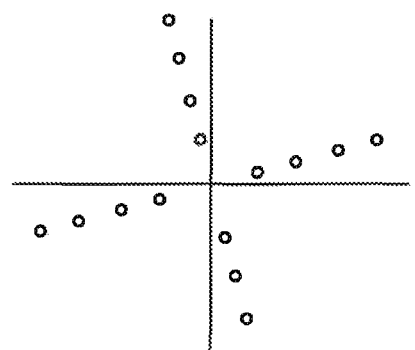
FIG. 6 schematically illustrates the signal space of FIG. 5 where a phase error of $\pi/6$ has moved signal points from their nominal positions.
Figure 7:
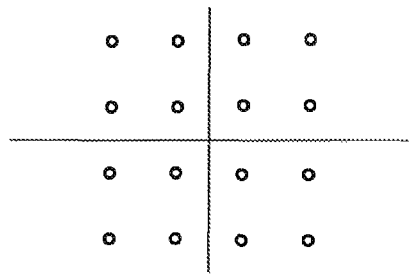
FIG. 7 schematically illustrates a signal space with nominal positions of possible signal points for a 16-QAM signal scheme.
Figure 8:
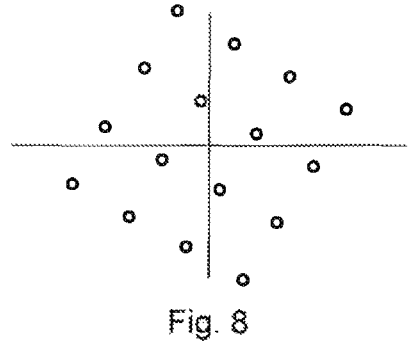
FIG. 8 schematically illustrates the signal space of FIG. 7 where a phase error of $\pi/6$ has moved signal points from their nominal positions.

FIG. 3 schematically illustrates a signal space with nominal positions of possible signal points for a 64-QAM signal scheme, which in the example explained below is used for the "main" constellation, i.e. the symbols of a first type arranged to carry as much data load as the channel permits or the service requires. FIG. 4 schematically illustrates the signal space of FIG. 3 where a phase error of $\pi/6$ has moved signal points from their nominal positions, which is illustrated to show the need of more robust symbols to be added as pilots for tracking phase. FIG. 5 schematically illustrates a signal space with nominal positions of possible signal points for a 4×4 A-PSK signal scheme, and FIG. 6 schematically illustrates the signal space of FIG. 5 where a phase error of $\pi/6$ has moved signal points from their nominal positions. For comparison, FIG. 7 schematically illustrates a signal space with nominal positions of possible signal points for a 16-QAM signal scheme, and FIG. 8 schematically illustrates the signal space of FIG. 7 where a phase error of $\pi/6$ has moved signal points from their nominal positions. Here, when comparing FIGS. 6 and 8, it is clear that the robustness of the A-PSK symbol is better in sense of phase error tracking than the 16-QAM symbol, considering that both the symbols are able to carry the same data load.

Any N-QAM main constellation has a phase ambiguity of $\pi/2$ and the phase ambiguity of the pilot symbols must therefore be $\pi/2$ or $\pi$. This leads to a constellation where points are located radially along 2 or 4 axes, preferably with a minimum distance that equals the constellation point distance of the high order main constellation. This type of constellation is further on named "A-PSK-pilots" (Amplitude and Phase Shift Keying pilots).

This invention is suitable for a communication system with N-QAM modulation where embedded pilot symbols of lower constellation order are regularly inserted in order to improve phase tracking performance and where these pilot symbols are used to carry data. Since the pilot symbols carry data, a Pilot-PLL is used which make use of the improved phase tracking properties of the pilot symbols with lower constellation order as compared to the main symbols.

In order to fully exploit the tracking capabilities of pilot symbols with a signal constellation above 4QAM, a dedicated pilot constellation is used where the dominant symbol decision errors in the pilot PLL do not result in false phase detection which otherwise will reduce the phase tracking enhancement from the inserted pilot symbols.

One example of an A-PSK-pilot is shown in FIG. 5. In this case a 4×4 APSK-pilot is shown. In the notification "$N_1 \times N_2$ A-PSK-pilot" $N_1$ defines the number of points on each axis and $N_2$ defines the number of axis (2 or 4).

In this example the 4×4 A-PSK-pilot is used as pilot symbols for a 64QAM main constellation as illustrated in FIG. 3, and for comparison, a traditional 16QAM-pilot is shown in FIG. 7. As seen from FIGS. 5 to 8 both pilot symbols can carry 4 bits of data but the A-PSK-pilot constellation is changed in such a way that the bit-error probability is increased to the same level as the main constellation (distance "d") while the phase detection error probability is minimized.

For any main constellation order (N-QAM) a suitable N1×N2 APSK-pilot is selected in order to optimize the performance in the actual signal environment.

Figure 9:
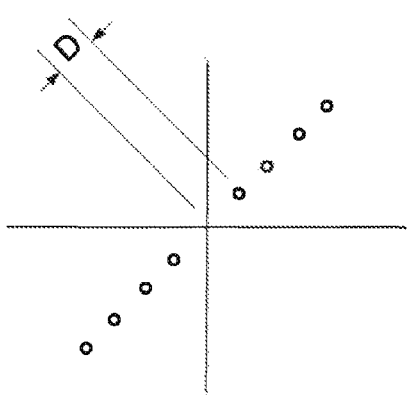
FIGS. 9 and 10 schematically illustrate a signal space with nominal positions of possible signal points for a 4×2 A-PSK signal scheme, and where a phase error of $\pi/6$ has moved signal points from their nominal positions, respectively.
Figure 10:
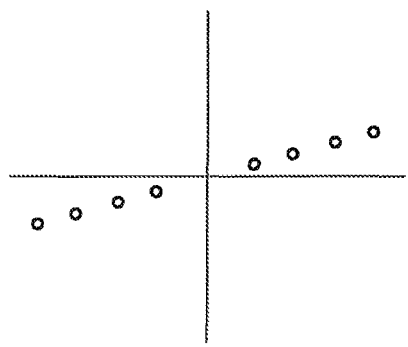

FIGS. 9 and 10 schematically illustrate a signal space with nominal positions of possible signal points for a 4×2 A-PSK signal scheme, and where a phase error of $\pi/6$ has moved signal points from their nominal positions, respectively. The distance D is preferably chosen to provide enough robustness to additional noise, i.e. other than phase error, to still be able to track the phase from the pilot symbols. It is further to be noted that for this $N_1 \times 2$ constellation, it is only necessary to determine which half-plane the received signal belongs to for determining expected nominal phase of the symbol for the phase calculation. For the $N_1 \times 4$ constellation, as of FIGS. 5 and 6, it is only necessary to determine which quadrant the received signal belongs to for determining expected nominal phase. This rough symbol phase decision implies both a less complex symbol decision in sense of phase, and a robust tracking for phase calculation in sense of any symbol errors depending on other introduced noise, i.e. other than phase error, in the signal.

Figure 11:
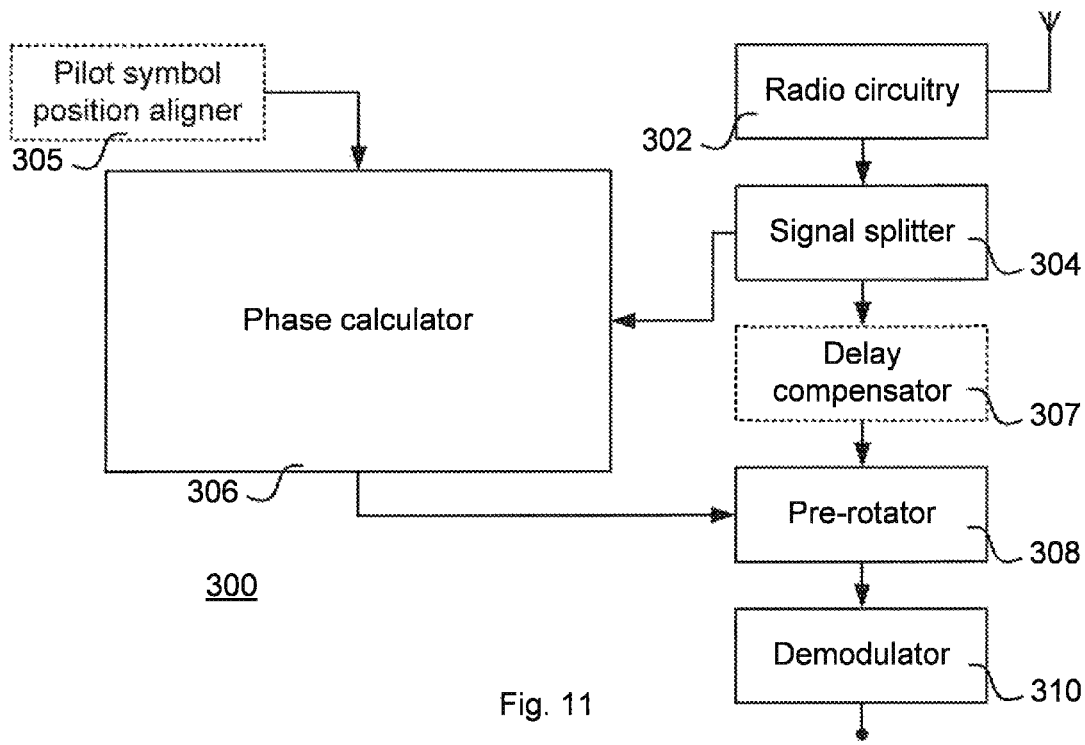
FIG. 11 is a block diagram schematically illustrating a receiver according to embodiments.

FIG. 11 is a block diagram schematically illustrating a receiver 300 according to embodiments. The receiver 300 is adapted to work with the signal and symbol set as elucidated above. The receiver 300 comprises radio circuitry 302 for receiving a radio signal comprising the signal. The radio circuitry 302 preferably provides a baseband signal on which the here demonstrated processing is performed. The receiver 300 further comprises a signal splitter 304, a phase calculator or phase error calculator 306, a pre-rotator 308 and a demodulator 310. The signal splitter 304 is arranged to provide the signal to the phase error calculator 306 and to the signal pre-rotator 308. The phase calculator or phase error calculator 306 is arranged to determine symbol phase value and phase or phase error from symbols of the second type, and to provide determined phase or phase error to the signal pre-rotator 308. Here, the element 306 can either be arranged to determine the actual phase of the received signal by means of the symbols of the second type, i.e. being a phase calculator, or be arranged to determine the phase error of the received signal by means of the symbols of the second type, i.e. being a phase error calculator. The signal pre-rotator 308 is arranged to perform a phase correction according to the determined phase or phase error and provide the corrected signal to a symbol demodulator 310. Depending on whether the input is the actual phase or a phase error, the signal pre-rotator 310 will adjust the phase by, when the phase error is provided rotate "back" the signal using the provided phase error, or when the actual phase is provided adjusting the phase to align the phase of the received signal and a reference phase of the symbol demodulator. The symbol demodulator 310 is arranged to determine data carried by the symbols by demodulating the corrected signal. An optional delay compensator 307 can be provided to compensate for any delay implied by the phase error calculator 306 such that the calculated phase error and the signal to be corrected by the signal pre-rotator 308 are aligned. By the phase error tracking, the demodulator is enabled to output a data stream with less error, and in particular avoid bursts of erroneous data due to loss of phase tracking Furthermore, the demodulator 310 is enabled to provide a data stream including data carried both by the symbols of the first type and of the second type. Here, the demodulator 310 should be seen functionally, and may comprise one or more elements depending on ability to demodulate different types of symbols. The ability to carry data also by the pilot symbols increases throughput.

Figure 12:
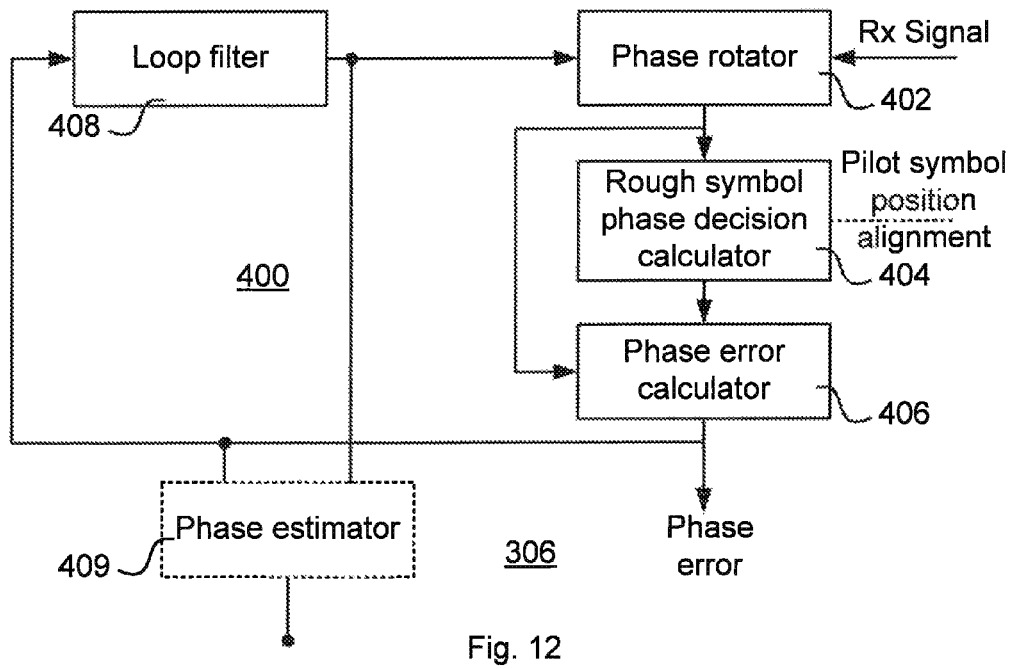
FIG. 12 is a block diagram schematically illustrating a phase error calculator according to embodiments.

FIG. 12 is a block diagram schematically illustrating a phase calculator or phase error calculator 306 according to embodiments. The phase calculator or phase error calculator 306 comprises a PLL 400 comprising a phase rotator 402, a rough symbol phase decision calculator 404, a phase error calculator 406, and a loop filter 408. The phase rotator 402 is arranged to receive the signal and a filtered phase value from the loop filter 408. The phase rotator 402 is arranged to provide a rotated signal value. i.e. the signal phase shifted according to the filtered error signal, to the phase error calculator 406 and the rough symbol phase decision calculator 404, wherein the rough symbol phase decision calculator 404 is arranged to determine nominal phase of the received symbol of the second type, i.e. π/4, π/4, 5π/4 or 7π/4, or π/4 or 5π/4, or 3π/4 or 7π/4 (all given counter clockwise from first axis of signal space as of FIGS. 3 to 10), and provide the symbol phase value to the phase error calculator 406. Information provided for example from network signalling on pilot symbol alignment can be provided for finding the symbols, and for providing information on the type of pilot symbol, i.e. $N_1 \times 2$ or $N_1 \times 4$. The phase error is provided to the loop filter 408 through which the error is filtered to provide the filtered phase to the phase rotator 402.

The phase calculator or phase error calculator 306 can be arranged to calculate phase of the symbol from the phase position of the symbol and the rotated signal value by a calculation element 409. The phase estimator 409 can provide an estimate of phase error from the phase error output from the phase error calculator 406 and from the filtered phase output from the loop filter 408 wherein the estimate of phase error of the signal is provided for the phase error compensation.

In practice, a number of consecutive phase estimates are filtered such that effects from e.g. thermal noise are reduced.

The rough symbol phase decision calculator 404 can be arranged to determine phase position of the symbol by determining which half-plane or which quadrant the symbol belongs to, for a symbol having two or four nominal phase positions, respectively, as demonstrated above.

Figure 13:
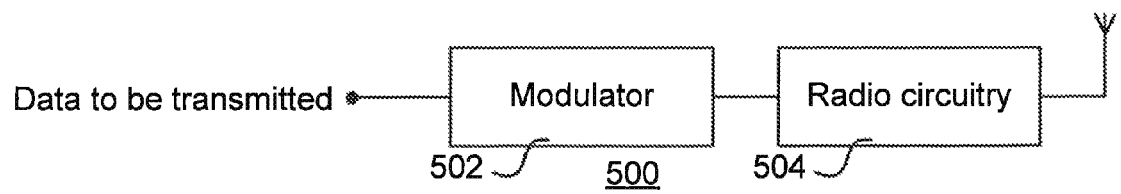
FIG. 13 is a block diagram schematically illustrating a transmitter according to an embodiment.

FIG. 13 is a block diagram schematically illustrating a transmitter 500 according to an embodiment. The transmitter 500 receives a data stream to be transmitted and modulates the data stream into symbols to be transmitted, as demonstrated above, by a modulator 502. Here, the payload data is distributed between the first set of symbols of the first type, which carries the major part of the payload, and the second set of symbols of the second type, which tops up the ability of throughput in addition to the purpose of phase correction pilot symbols. Radio circuitry 504 transmits the modulated symbols.

Figure 14:
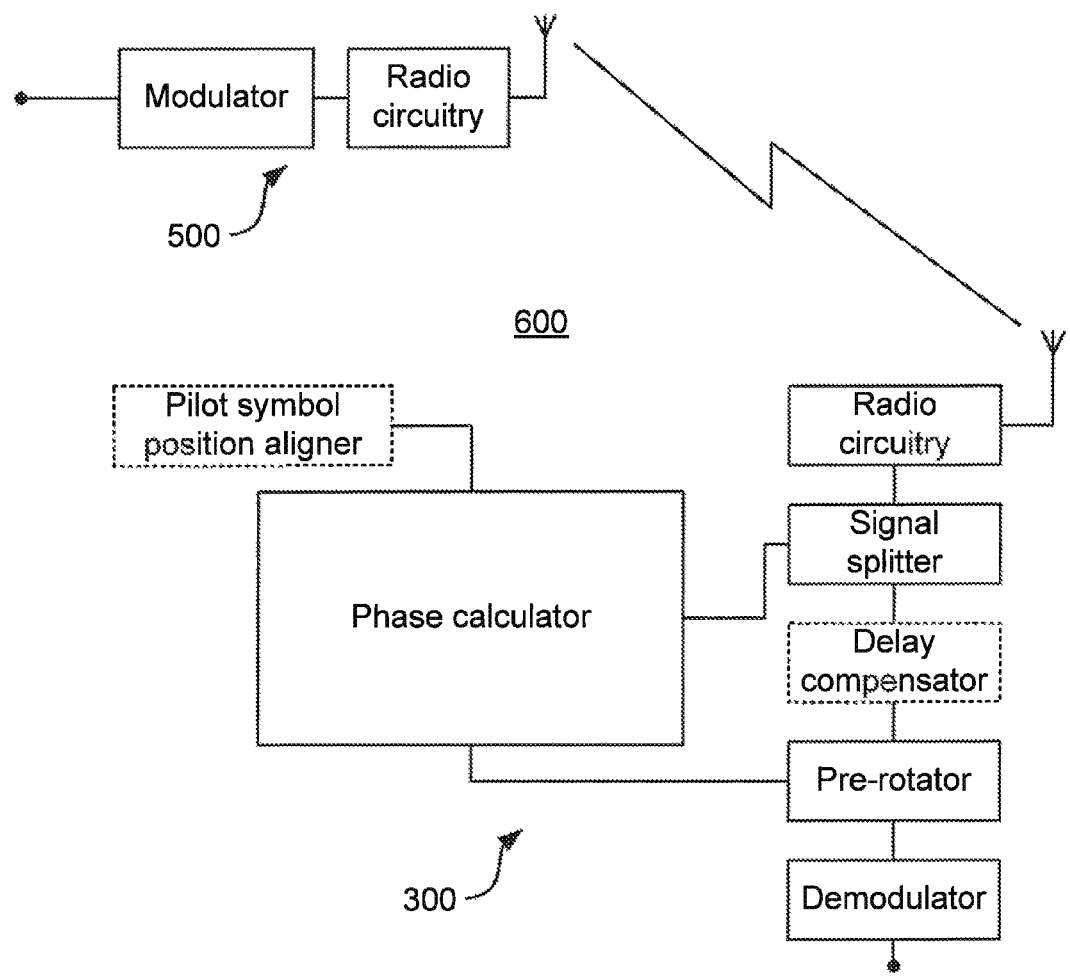
FIG. 14 is a block diagram schematically illustrating a communication system according to an embodiment.

FIG. 14 is a block diagram schematically illustrating a communication system 600 according to an embodiment. The communication system 600 includes a transmitter 500, as demonstrated with reference to FIG. 13, and a receiver 300, as demonstrated with reference to FIG. 11, such that a data transmission from the transmitter 500 to the receiver 300 is enabled. In practice, each entity in the communication system 600 comprises both a receiver 300 and a transmitter 500 such that transmissions in any direction are enabled. A suitable application for the communication system is radio links, where the radio link is used instead of wired communication between two communication nodes.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of compensating phase error of a received signal, the method comprising
receiving a signal representing a symbol set comprising a plurality of symbols of a first type having an N-Quadrature Amplitude Modulation (N-QAM) signal configuration, where N is an integer larger than 4, and at least one symbol of a second type having an Amplitude and Phase-Shift Keying (A-PSK) signal configuration, wherein both the symbols of the first type and of the second type carry data and wherein the symbols of the second type also are arranged as pilot symbols for determination of phase rotation;
providing the signal to a phase calculator;
determining symbol phase value and phase error from symbols of the second type by the phase calculator;
providing determined phase by the phase calculator;
performing a phase correction according to the determined phase and providing the corrected signal to a symbol demodulator; and
determining data carried by the symbols by demodulating the corrected signal by the symbol demodulator.

2. The method according to claim 1, wherein the N-QAM symbols have a minimum distance d between any nominal signal points of signal space and the A-PSK has a minimum distance between any nominal signal points of signal space being equal or larger than d.

3. The method according to claim 1, further comprising delaying the signal before providing it to phase correction such that any signal delay of the phase calculator is compensated.

4. The method according to claim 1, wherein the A-PSK symbol has a N1×N2 configuration, where N1 is an integer larger than one defining the number of signal points on each phase-shift keyed position, and N2 defines the number of phase-shift keyed positions and being either of 2 or 4.

5. The method according to claim 1, wherein the determining of symbol phase value and phase error from symbols of the second type comprises
i) phase rotating the signal according to a previously determined phase by a phase rotator;
ii) determining a rough symbol phase value from the phase rotated signal by determining which half-plane or which quadrant the symbol belongs to, for a symbol having two or four nominal phase positions, respectively;

iii) calculating the phase of the signal from the determined symbol phase value and the phase position of a signal point of the signal; and iv) filtering the phase and providing it to the phase rotator such that next symbol of the signal is enabled to be phase rotated according to step i).

6. A receiver for receiving a signal, the receiver comprising radio circuitry for receiving a signal representing a symbol set comprising a plurality of symbols of a first type having an N-Quadrature Amplitude Modulation, N-QAM, signal configuration, where N is an integer larger than 4, and at least one symbol of a second type having an Amplitude and Phase-Shift Keying (A-PSK) signal configuration, wherein both the symbols of the first type and of the second type carry data and wherein the symbols of the second type also are arranged as pilot symbols for determination of phase rotation;

a signal splitter arranged to provide the signal to a phase calculator and to a signal pre-rotator;

the phase calculator is arranged to determine symbol phase value and phase from symbols of the second type, and to provide determined phase to the signal pre-rotator, wherein the signal pre-rotator is arranged to perform a phase correction according to the determined phase and provide the corrected signal to a symbol demodulator, and the symbol demodulator is arranged to determine data carried by the symbols by demodulating the corrected signal.

7. The receiver according to claim 6, wherein the phase calculator comprises a phase-locked loop, PLL, comprising a phase rotator, a rough symbol phase decision calculator and phase error calculator, and a loop filter, wherein the phase rotator is arranged to receive the signal and a filtered phase value from the loop filter on which the phase rotator is arranged to provide a rotated signal value to the phase error calculator and the rough symbol phase decision calculator, wherein the rough symbol phase decision calculator is arranged to determine nominal phase of the received symbol of the second type and provide the symbol phase value to the phase error calculator, and the phase error calculator is arranged to calculate phase error of the symbol from the phase position of the symbol and the rotated signal value, which phase error is provided to the loop filter through which the phase is filtered to provide the filtered phase to the phase rotator.

8. The receiver according to claim 7, wherein the phase calculator further comprises a phase estimator providing an estimate of phase from the phase error output from the phase error calculator and from the filtered phase output from the loop filter such that the estimate of phase of the signal is provided to the pre-rotator.

9. The receiver according to claim 6, wherein the phase calculator is arranged to determine the phase error and provide the phase error to the pre-rotator.

10. The receiver according to claim 7, wherein the rough symbol phase decision calculator is arranged to determine phase position of the symbol by determining which half-plane or which quadrant the symbol belongs to, for a symbol having two or four nominal phase positions, respectively.

11. The receiver according to claim 6, wherein the symbol demodulator is arranged to provide output data carried by both the symbols of the first type and of the second type.

12. A transmitter of a signal, the transmitter comprising
a modulator arranged to generate a modulated signal representing a symbol set comprising a plurality of symbols of a first type having an N-Quadrature Amplitude Modulation (N-QAM) signal configuration, where N is an integer larger than 4, and at least one symbol of a second type having an Amplitude and Phase-Shift Keying (A-PSK) signal configuration, wherein both the symbols of the first type and of the second type carry data and wherein the symbols of the second type also are arranged as pilot symbols for determination of phase rotation at destination; and radio circuitry for transmitting the modulated signal.

13. The transmitter according to claim 12, wherein the N-QAM symbols have a minimum distance d between any nominal signal points of signal space and the A-PSK has a minimum distance between any nominal signal points of signal space being equal or larger than d.

14. The transmitter according to claim 12, wherein the A-PSK symbol has a N1×N2 configuration, where N1 is an integer larger than one defining the number of signal points on each phase-shift keyed position, and N2 defines the number of phase-shift keyed positions and being either of 2 or 4.

15. A communication system for data transmission of a signal, the communication system comprising:
a transmitter comprising:
a modulator arranged to generate a modulated signal representing a symbol set comprising a plurality of symbols of a first type having an N-Quadrature Amplitude Modulation (N-QAM) signal configuration, where N is an integer larger than 4, and at least one symbol of a second type having an Amplitude and Phase-Shift Keying (A-PSK) signal configuration, wherein both the symbols of the first type and of the second type carry data and wherein the symbols of the second type also are arranged as pilot symbols for determination of phase rotation at destination; and
radio circuitry for transmitting the modulated signal; and
a receiver comprising radio circuitry for receiving the signal; a signal splitter arranged to provide the signal to a phase calculator and to a signal pre-rotator, wherein:
the phase calculator is arranged to determine symbol phase value and phase from symbols of the second type, and to provide determined phase to the signal pre-rotator;
the signal pre-rotator is arranged to perform a phase correction according to the determined phase and provide the corrected signal to a symbol demodulator; and
the symbol demodulator is arranged to determine data carried by the symbols by demodulating the corrected signal.

* * * * *